United States Patent [19]
Yamaguchi

[11] 4,098,141
[45] Jul. 4, 1978

[54] ENERGY ABSORBING STEERING ASSEMBLY

[75] Inventor: Mikio Yamaguchi, Takasaki, Japan

[73] Assignee: Nippon Seiko Kabushiki Kaisha, Tokyo, Japan

[21] Appl. No.: 742,131

[22] Filed: Nov. 15, 1976

[51] Int. Cl.² ............................................. B62D 1/18
[52] U.S. Cl. ......................................... 74/492; 180/78
[58] Field of Search ................... 74/492, 493; 180/78; 280/750

[56] References Cited

U.S. PATENT DOCUMENTS

| | | | |
|---|---|---|---|
| 3,392,599 | 7/1968 | White | 74/492 |
| 3,459,063 | 8/1969 | Numazawa | 74/492 |
| 3,600,970 | 8/1971 | Loofbourrow | 74/492 X |

*Primary Examiner*—Edgar W. Geoghegan
*Attorney, Agent, or Firm*—Shapiro and Shapiro

[57] ABSTRACT

The energy absorbing steering assembly of this invention has a steering shaft collapsible as a vehicle impacts an obstacle, and the steering shaft consists of an upper and lower shafts, and the upper portion of the lower shaft and the lower portion of the upper shaft fit with each other. A spherical projection is provided on the surface of an unfitted portion of one of said shafts spaced a given distance from the end surface of the fitted portion, said one shaft being fitted into the inside of the other shaft. When the steering shaft is collapsed, said spherical projection of the one shaft enters into the inner surface of the other shaft so as to produce a plastic deformation on this inner surface to absorb the impact energy.

10 Claims, 10 Drawing Figures

ENERGY ABSORBING STEERING ASSEMBLY

BACKGROUND OF THE INVENTION

1. Field of the Invention

This invention relates to a steering assembly for a vehicle, and more particularly to an energy absorbing steering assembly for protecting a driver which is collapsible and absorbs the energy when a vehicle impacts on an obstacle.

2. Description of the Prior Arts

A conventional energy absorbing steering assembly, for example, U.S. Pat. No. 3,262,332 issued to Robert D. Wight comprises a steering gear box fixed to a vehicle, a telescopeable steering shaft assembly connected at one end to said gear box and having a steering wheel mounted on the other end thereof, an intermediate column surrounding said shaft assembly and rigidly connected to said vehicle, and energy absorbing means interposed between said shaft assembly and said column operative to impact controlled resistance to telescoping movement of said shaft assembly in either direction.

U.S. Pat. No. 3,373,629 issued to Robert D. Wight et al. discloses an energy absorbing mesh portion constructed of a network of intersecting and interconnected strips directed angularly of the axis of the steering column. The network provides the diamond shape perforations in the flat stock of the mast jacket before forming it into a cylinder.

U.S. Pat. No. 3,392,599 issued to Robert L. White discloses a device for absorbing the kinetic energy of impacts comprises a pair of members arranged for movement relative to each other upon the application of impact force thereto, and a rolling body engaged between two membes with predetermined interference fit and having portions formed for localized contact therewith. The interference fit of such degree as to effect predetermined localized plastic deformation along a path of travel in at least one of said members as the rolling body rolls due to relative movement therebetween thereby to absorb the energy of the movement. In this patent the rolling body is always engaged between two members with predetermined interference fit, which requires a precise finish working.

U.S. Pat. No. 3,373,630 issued to Byron T. Heurtebise describes a telescopic steering column assembly in which one or more of the column members thereof is constructed and arranged to readily structurally deform under impact loading thereon and absorb the energy of the impact.

As above described, there are various kinds of energy absorbing means to absorb the energy of the impact force, however, these means require expensive manufacturing costs.

SUMMARY OF THE INVENTION

The object of this invention is to provide a simple structure of energy absorbing assembly, which is very cheap to manufacture and yet very effective.

The other object of this invention is to provide an improved and safe energy absorbing assembly which has a load characteristic of impact force having a low peak load.

For achieving these objects, the present invention provides an energy absorbing assembly consisting of a steering column and a steering shaft, and the steering column fits the outside of the steering shaft and is held by the vehicle body so as to freely rotatably support the steering shaft; the steering shaft consists of an upper shaft mounting a hand wheel and a lower shaft connected to a steering gear, the lower end portion of the upper shaft and the upper end portion of the lower shaft collapsibly fit with each other so as to transmit the rotation of the upper shaft to the lower shaft; and a spherical projection is provided at an unfitted portion of one of the shafts departed a certain distance from the end of the fitted portion, the said one shaft being fitted within the inside of the other shaft.

DESCRIPTION OF THE PREFERRED EMBODIMENT

Figure 1:
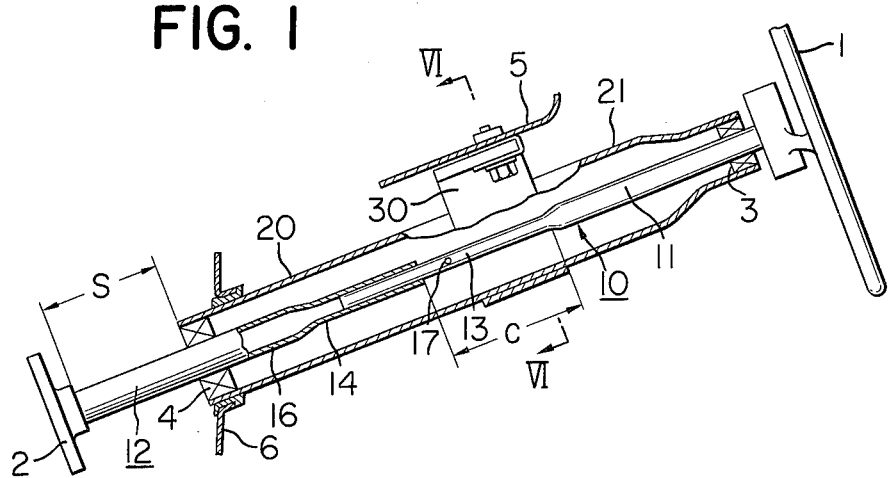
FIG. 1 is a longitudinal sectional view of a portion of an energy absorbing steering assembly of an embodiment of this invention.
Figure 3:
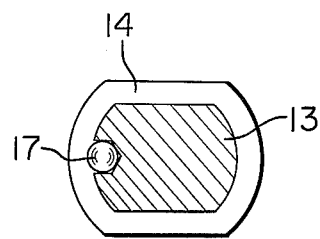
FIG. 3 is an enlarged transverse cross section taken along III—III line of FIG. 2.

In FIG. 1, steering shaft 10 which transmits the rotation of steering wheel 1 to the steering gear (not shown) consists of upper shaft 11 mounting said steering wheel 1 and lower shaft 12 connected to the steering gear through flange 2 of a flange coupling. The lower end portion 13 of upper shaft 11 has a cross section of an ellipsoid except having both flat side portions as shown in FIG. 3.

The tube portion 14 constituting the upper end portion of lower shaft 12 has a similar cross section to that of the end portion 13 so that the lower end portion 13 of upper shaft 11 fits within the upper end portion 14 of lower shaft 12. The length of the lower end portion 13 of upper shaft 11 is the length of the portion fitted within the upper end portion 14 plus the length of the collapse stroke C as shown in FIG. 1.

Figure 2:
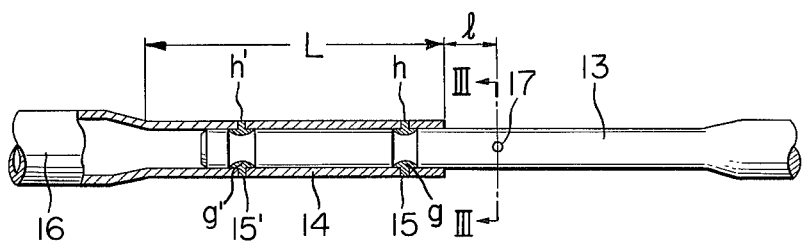
FIG. 2 is an enlarged cross section of the important portion of the embodiment shown in FIG. 1.

The length of the semi-ellipsoid shaped upper end portion 14 of lower shaft 12 is L in FIG. 2, which equals the energy absorbing stroke. The lower end of this upper end portion 14 is connected to the circular tube 16, in which the upper shaft 11 can enter when collapsed.

As shown in FIG. 2, the upper end portion 14 has small holes h, h' penetrating its wall and the lower end portion 13 of upper shaft 11 has at its external surface circular grooves g, g', at the portions corresponding to said holes h, h'. After the lower end portion 13 is inserted into the upper end portion 14, thermoplastic synthetic resin is projection moulded from the holes h, h' into the grooves g, g' to fill the holes and grooves so as to form shear pins 15, 15' at two positions axially separated by a given distance.

A steel ball 17 is embedded in one of the shafts, the upper shaft 13 in FIG. 2, at a position spaced a distance 1 from the end surface of the fitted portion of the upper and lower shafts. In this embodiment, the ball 17 is located on the lower end portion 13 which is not fitted into the tubing portion 14 of the lower shaft 12, and a spherical surface portion of the ball 17 projects externally from the surface of the lower end portion 13 of the upper shaft 11 as shown in FIG. 3. The ball 17 is driven into a drilled hole having a diameter smaller than the diameter of the ball 17.

The steering shaft 10 having the structure as explained heretofore is inserted into the steering column 20 through the aid of two bearings 3, 4 and rotatably supported by the column 20.

Figure 6:
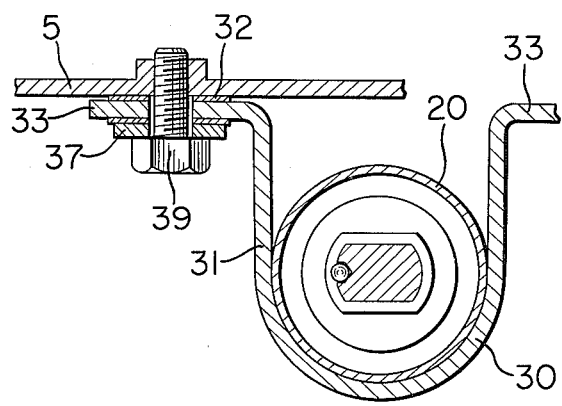
FIG. 6 is an enlarged transverse cross section taking along the VI—VI line of FIG. 1.
Figure 7:
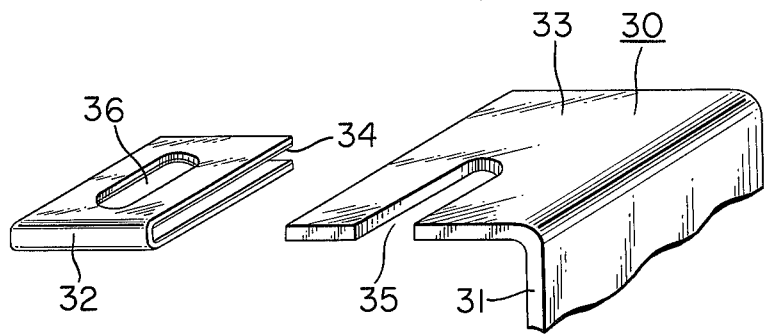
FIG. 7 is a perspective view showing a portion of a column bracket and washer member in disassembled relation.

The steering column 20 is held by instrument panel 5 of the body portion through the aid of column bracket 30 fixed to the steering column 20 by means such as welding as shown in FIG. 6. The lower portion of the steering column 20 is slidably fitted into the dash board 6 as shown in FIG. 1. The column bracket 30, as shown in FIGS. 6 and 7, has a cross sectional portion 31 fixed to the steering column 20 and planar portions 33 extending from both ends of the U-shaped portion 31. A planar portion 33 has an elongated hole 35 open at its one end toward the steering wheel 1. The hole 35 is covered by washer 32 as shown in FIG. 7. The washer 32 is made of a thin plate folded to U-shape form, and is provided with a thin layer 34 coating of a synthetic resin, for example, Teflon (Trademark) having a low slide-friction coefficient. The planar portions of the washer have elongated holes 36 corresponding to the hole 35. Bolt 39 is inserted into these holes 35 and 36 through flat washer 37 so as to fix the column bracket 30 to the instrument panel 5.

The operation of the above mentioned embodiment is as follows:

When a vehicle receives an impact force, the steering shaft 10 is pushed up from the bottom. Relative movement in an axial direction between the steering shaft 10 and the steering column 20 is restricted by the bearing supporting the upper portion of the steering shaft 10. Although not shown, a ring may be fixed to the upper portion of the steering shaft 10, so that when an impact force is applied, the ring engages the tapered portion 21 (FIG. 1) of the steering column 20 so that the amount of the movement of the steering shaft 10 is kept small. The steering column 20 is fixed to the instrument panel 5 through the steering bracket 30. Since the elongated hole 35 is open at its one end toward the steering wheel, the steering shaft is movable toward the steering gear but is not movable by the bracket 30 toward the steering wheel.

Next, the second impact force between the driver and the steering wheel occurs, and the steering shaft 10 and the steering column 20 which is impacted on the boss of the steering wheel start to move downwardly. The movement of the steering shaft 10 starts with the cutting of the shear pins 15, 15' (FIG. 2) provided at two places, respectively, and the lower end portion 13 of the upper shaft 11 comes into the portions 14 and 16 of the lower shaft. The steel ball 17 embedded in the surface of the lower portion 13 moves a definite distance l and arrives at the end surface of the fitted portion. The steering column 20 and the column bracket 30 slip downward and disengage from the washer member 32.

The axial load applied to the steering column 20 when the column bracket 30 leaves the washer 32 is maintained at a definite value by appropriately selecting the tightening force of the bolt 39. By the application of the thin layer 34 of, for example, Teflon (Trademark) to the washer member 32, said axial load can be made a low value. The steering column 20 is movable a distance S in FIG. 1, which is a column collapse stroke.

Figure 5:
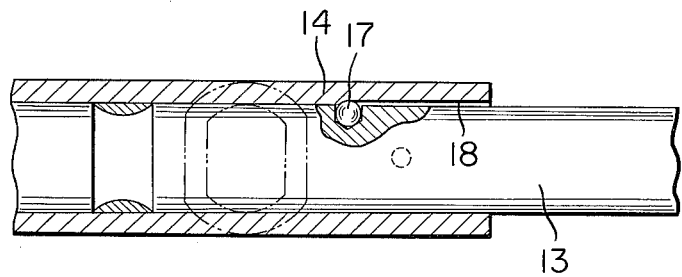
FIG. 5 is a longitudinal cross section showing the state of plastic deformation by telescoping one shaft into the other shaft of the steering shaft.

As the steel ball 17 is forced to come into the inner surface of the ellipsoidal tubing portion 14, a localized plastic deformation 18 along a path of travel of the ball 17 is formed in the inner surface of the portion 14 by the spherical portion of the ball 17 projecting out of the surface of the portion 13 as shown in FIG. 5. The plastic deformation can be produced along the total length of the energy absorbing stroke L, which is equal to the length of the ellipsoidal tubing portion 14, so as to absorb the second impact energy. Consequently, the amount of the projection of the ball 17 out of the surface of the lower portion 13 and the size of the inner diameter of the tubing portion 14, number of balls 17 and the size of the energy absorbing stroke L affect the energy absorption, so that it is necessary to select these dimensions to conform with desired energy absorbing ability.

The definite distance l between the ball and the end surface of the fitted portion as shown in FIG. 2 is provided to produce, at different times, the peak load occurring when the shear pins 15 are cut, the peak load when the column bracket is removed from the washer member 32 and the peak load when the desired energy absorption is initiated.

In the above described embodiment, only one ball 17 is provided, but two or more balls may be provided at positions different in radial direction or different both in radial and axial directions.

Figure 4:
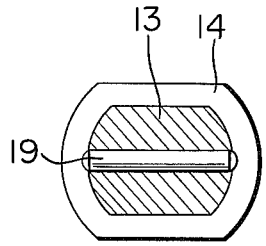
FIG. 4 is an enlarged cross section similar to FIG. 3 but of another embodiment of the invention.

In FIG. 4, pin 19 having spherical surfaces at both ends thereof is provided instead of the steel ball shown in FIG. 13, and either or both of the spherical surfaces of the pin 19 is projected out of the surface of the lower end portion of the upper shaft 11.

Figure 8:
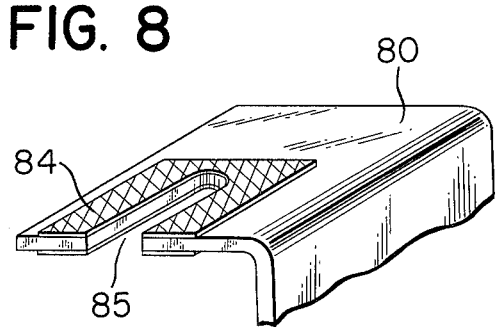
FIG. 8 is a perspective view of another embodiment of the column bracket.

FIG. 8 shows an another embodiment of the column bracket. The column bracket 80 has a similar shape to that of FIGS. 6 and 7. In this bracket, however, on upper and back surfaces surrounding the elongated hole 85 open at one end toward the steering wheel 1, thin layers 84 coated with Teflon are provided so that the bracket may be mounted to the instrument panel 5 by a bolt 39 without using the described washer member 32. This bracket 80 functions the same as the bracket 30 shown in FIGS. 6 and 7.

Figure 9:
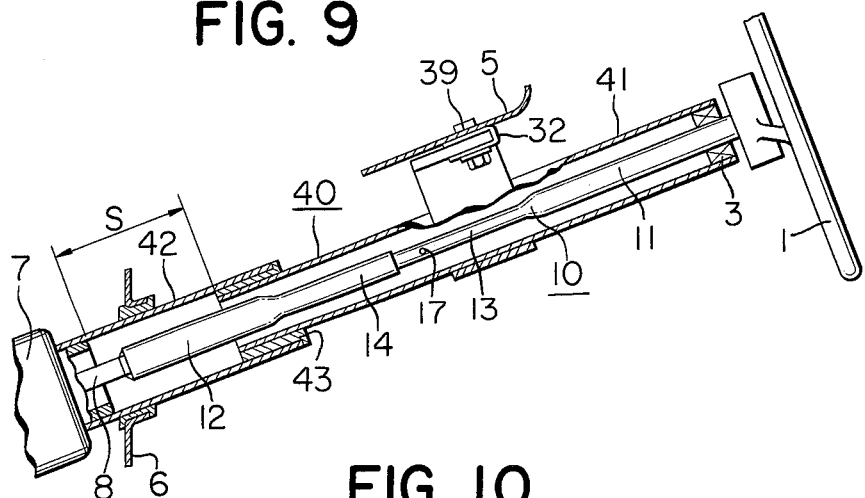
FIG. 9 is a longitudinal cross section of another embodiment of the steering assembly shown in the same condition as shown in FIG. 1.
Figure 10:
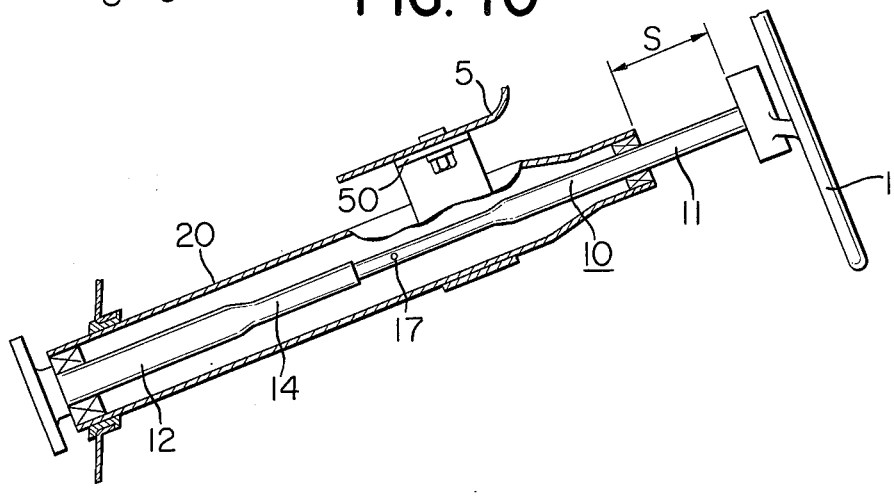
FIG. 10 is a longitudinal cross section of still another embodiment of the steering assembly in which the steering column is secured in fixed relation to the body portion.

FIG. 9 shows a second embodiment of the steering assembly, in which a steering column is different from that shown in FIG. 1. In FIG. 10, the means for holding the steering column to the vehicle body is different than the holding means described previously. The parts common to those of the first embodiment are designated by the same reference numerals.

In FIG. 9, the lower shaft 12 of the steering shaft 10 is connectd to a worm shaft 8 of a steering gear 7. The steering column 40 consists of upper column 41 and lower column 42. The upper column 41 is held by the instrument panel 5 by the column bracket 30 in the same manner as in the first embodiment, and the steering shaft 10 is supported by the upper column 41 through a bearing 3. The upper column 41 is fitted in the lower column 42 through a bushing 43, and the lower portion of the lower column 42 is extended through the dash board 6. The bushing is made of an elastic material having a low friction coefficient to reduce the sliding resistance when the upper column 41 collapses into the lower column 42 by the column collapse stroke S, and to prevent noise between the upper and lower columns in normal operation. The column bracket 50 shown in FIG. 10 is not removably fixed to the instrument panel 5 so as to allow the collapse by a distance S between the lower surface of the boss of the steering wheel 1 and the upper end surface of the steering column 20.

In these latter embodiments, the steering column and column bracket are modified in structure for suitably adapting them to a vehicle, but the energy absorbing ability is the same as that in the first embodiment.

In all of the above described embodiments, the upper shaft of the steering shaft 10 enters into the lower shaft in collapsing. It is apparent that it is possible to realize the advantages and improved results of the invention by making the lower shaft collapse into the upper shaft.

What is claimed is:

1. An energy absorbing assembly comprising a steering column and a steering shaft, the steering column being externally fitted to the steering shaft to rotatably support it and held by a vehicle body, the steering shaft consisting of an upper shaft mounting a steering wheel of the vehicle and a lowe shaft connected to a steering gear, the lower end portion of the upper shaft and the upper end portion of the lower shaft being collapsibly fitted to each other for transmissive rotation, and a projection having a spherical top surface provided in one of said upper and lower shafts at a position spaced a given distance from the end surface of the fitted portions of said two shafts, said one shaft being fitted into the other shaft.

2. An energy absorbing assembly according to claim 1, in which the lower end portion of the upper shaft fits into the upper end portion of the lower shaft and said projection is provided on the surface of the lower portion of the upper shaft not fitted in the upper end portion of the lower shaft and at a position spaced a given distance from the end surface of the fitted portions of the two shafts.

3. An energy absorbing assembly according to claim 1, in which the upper end portion of the lower shaft is fitted into the inside of the lower end portion of the upper shaft, and the projection having the spherical top surface is provided on the surface of the lower shaft not fitted into the upper shaft at a position spaced a given distance from the end surface of the fitted portions of the upper and lower shafts.

4. An energy absorbing assembly according to claim 2, in which the projection having the spherical top surface is a steel ball embedded in the surface of the shaft.

5. An energy absorbing assembly according to claim 2, in which the spherical top surface of the projection is formed by a spherical end surface of a pin extended through the shaft.

6. An energy absorbing assembly according to claim 1, in which the steering column is fixedly held by the vehicle body.

7. An energy absorbing assembly comprising a steering column and a steering shaft, the steering column being held by a vehicle body removably upon occurrence of a load in the axially downward direction exceeding a given value, the steering column being fitted externally of the steering shaft so as to support the steering shaft freely rotatably, the steering shaft consisting of an upper shaft mounting a steering wheel and a lower shaft connected to a steering gear, the lower end portion of the upper shaft and the upper end portion of the lower shaft being fitted to each other collapsibly for transmissive rotation, and a projection having a spherical top surface provided in one of said upper and lower shafts at a position spaced a given distance from the end surface of the fitted portions of said two shafts, and on the not-fitted portion of said one shaft which enters into the other shaft.

8. An energy absorbing assembly according to claim 7, in which the steering column is removably held by the vehicle body by a column bracket fixed to the steering column,, the column bracket having an elongated hole open at the end toward the steering wheel and provided on a portion to be mounted to the vehicle body, the elongated hole being covered by a washer member having a thin layer of a synthetic resin of a low slide-friction coefficient provided at the inner surface of a U-shaped washer member, the column bracket being held by the vehicle body by means extended through said elongated hole.

9. An energy absorbing assembly according to claim 7, in which the steering column is removably held by the vehicle body by a column bracket fixed to the steering column, the column bracket having an elongated hole open at the end toward the steering wheel and provided on a portion to be mounted to the vehicle body, thin layers of a synthetic resin material having a low slide-friction coefficient on the upper and back surfaces of the mounting portion of the bracket surrounding the elongated hole and the column bracket being held by the vehicle body by means under a predetermined tightening force.

10. An energy absorbing assembly according to claim 7, in which the upper column of the steering column is held by the vehicle body removably upon occurrence of a load in the axially downward direction exceeding a certain value and the lower column of the steering column is fitted collapsibly within the upper column and is fixed to the vehicle body.

* * * * *